(12) United States Patent
Maletzky et al.

(10) Patent No.: US 7,648,285 B2
(45) Date of Patent: Jan. 19, 2010

(54) OPTICAL WAVEGUIDE CONNECTOR

(75) Inventors: Manfred Maletzky, Eckernfoerde (DE); Oliver Hirsch, Kiel (DE)

(73) Assignee: GISMA Steckverbinder GmbH, Neumuenster (DE)

( * ) Notice: Subject to any disclaimer, the term of this patent is extended or adjusted under 35 U.S.C. 154(b) by 116 days.

(21) Appl. No.: 11/792,616

(22) PCT Filed: Nov. 22, 2005

(86) PCT No.: PCT/DE2005/002100

§ 371 (c)(1),
(2), (4) Date: Jun. 8, 2007

(87) PCT Pub. No.: WO2006/060979

PCT Pub. Date: Jun. 15, 2006

(65) Prior Publication Data

US 2008/0298753 A1 Dec. 4, 2008

(30) Foreign Application Priority Data

Dec. 9, 2004 (DE) .................. 10 2004 059 258

(51) Int. Cl.
*G02B 6/38* (2006.01)
(52) U.S. Cl. .................. 385/66; 385/60; 385/62; 385/67; 385/68; 385/69; 385/75
(58) Field of Classification Search .................. 385/60, 385/62, 66, 67, 68, 69, 75
See application file for complete search history.

(56) References Cited

U.S. PATENT DOCUMENTS

| 5,015,060 A | 5/1991 | Tamagno et al. |
| 5,838,857 A | 11/1998 | Niekrasz |
| 6,095,838 A * | 8/2000 | Brickett .................. 439/201 |

FOREIGN PATENT DOCUMENTS

| EP | 1279981 | 1/2003 |
| WO | WO 02/39169 | 5/2002 |
| WO | WO 03/048825 | 6/2003 |
| WO | WO 03/048827 | 6/2003 |
| WO | WO 2005/045175 | 5/2005 |

\* cited by examiner

*Primary Examiner*—Ryan Lepisto
(74) *Attorney, Agent, or Firm*—Diederiks & Whitelaw PLC

(57) ABSTRACT

An optical waveguide connecter includes a socket part having a first waveguide contact placed in a channel of the socket part, and a plug part with a second waveguide contact placed in a channel of the plug part. The plug part channel is sealed with a piston displaceable counter to the force of a spring. The socket part has a pivotable cap for sealing an interface surface of the first waveguide contact. The plug part has a path for receiving the piston, with a section of the path being inclined to the axis of the second waveguide contact. During a plugging process, the cap displaced the spring-loaded piston, frees the first waveguide contact of socket part, frees the second waveguide contact in the plug part channel and is guided through the path.

13 Claims, 4 Drawing Sheets

OPTICAL WAVEGUIDE CONNECTOR

CROSS-REFERENCE TO RELATED APPLICATIONS

Figure 1:
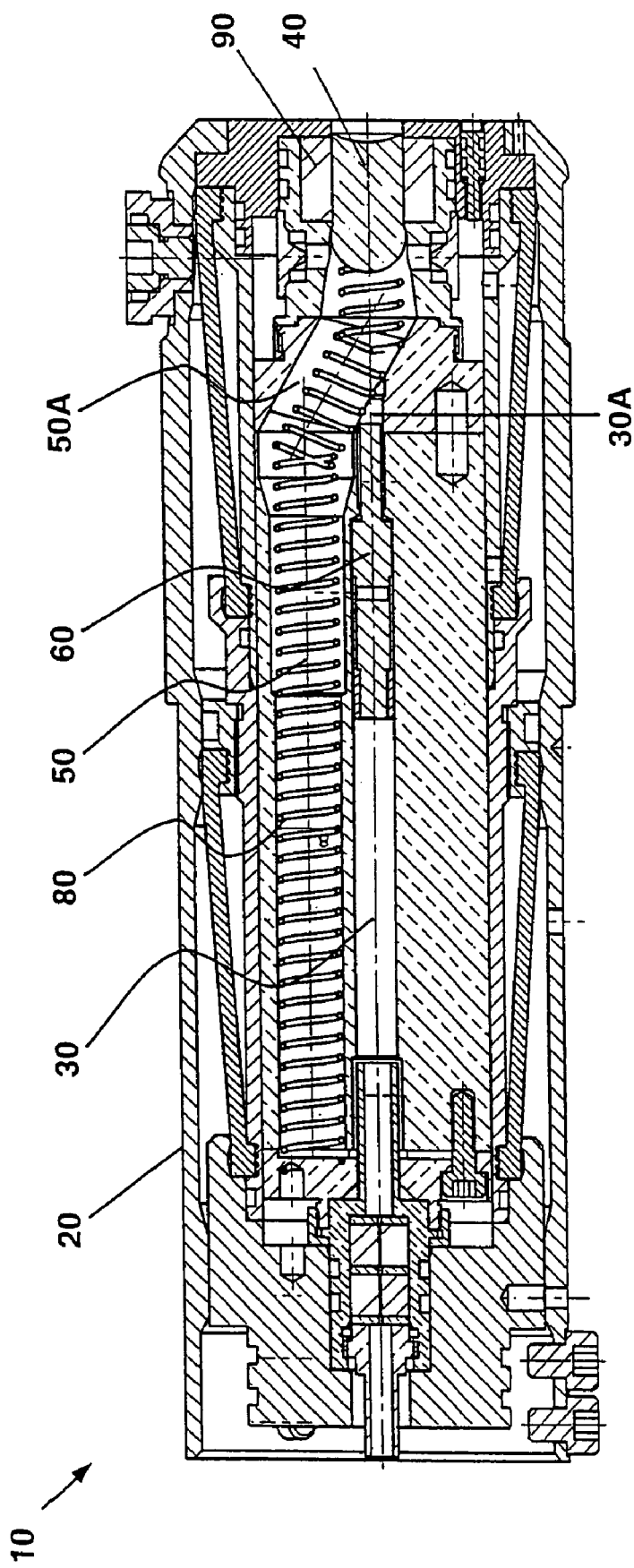

This application represents a National Stage application of PCT/DE2005/002100 entitled "Underwater Optical Waveguide Connector" filed Nov. 22, 2005.

The invention relates to an optical waveguide connector according to the preamble of the main claim.

Optical waveguides mainly for use in water are provided with a socket part having at least one first optical waveguide contact located in a channel of the socket part and a plug part having at least one second optical waveguide contact located in a channel of the plug part, the plug part channel being sealed with a piston displaceable against the force of a spring.

Such a connector for optical waveguides is e.g. known from EP 1 279 981 A2. This connector is constructed in such a way that during the plugging of a socket part with an exposed optical waveguide located at its one end into a plug part, there is a rinsing of the optical waveguide contact pin inserted in the socket and contamination which has entered the contact area is removed.

In the case of such connectors, which are wetted with a moisture film in the unplugged state, the problem arises that the connectors provide an ideal surface for the growth of e.g. marine plants or animals which cannot be removed by rinsing. In the case of optical waveguides severe contamination by the growth of even the smallest living organisms, e.g. microorganisms is problematical, because a contamination of the interface surface of the optical waveguide contact, particularly with small waveguide diameters, leads to a signal attenuation.

To avoid this problem e.g. WO 02/39169 A1 and WO 03/048827 A2 disclose devices which protect the optical waveguide contact surfaces of the connector from direct contact with moisture when in the unplugged state. However, the construction of such connectors is complicated and, as a result of its complexity, involves increased labour costs during manufacture.

Therefore the problem of the invention is to provide an optical waveguide connector protecting the waveguide against contamination in both the plugged and unplugged state using simple means.

The problem is solved by an optical waveguide connector having the features of claim 1. For use mainly in water, the advantageous optical waveguide connector has a socket part with at least one first waveguide contact located in a channel of the socket part and a plug part with at least one second waveguide contact located in a channel of the plug part, the plug part channel being sealed with a piston displaceable counter to the force of a spring, the socket part having a cap sealing the interface surface of the waveguide contact, which in the unplugged state covers the interface surface of the waveguide contact and in the plugged state pivots so as to free the interface surface, and the plug part has a path receiving the displaceable, spring-loaded piston, which in at least one section is inclined to the axis of the at least one waveguide contact of the plug part and during the plugging process the cap of the socket part and the displaceable, spring-loaded piston are guided by the path. Advantageous developments of the invention are given in the subclaims.

The fundamental idea of the invention is to cover the interface surface of the optical waveguide contact of the plug part in the unplugged state with a sealing piston, which during the plugging process displaces a channel of the plug part counter to the force of a spring in a path which at least in one section is inclined to the axis of the waveguide and in the unplugged state covers the interface surface of the waveguide contact of the socket part with a sealing cap, said cap also following the path in the plug part during plugging. Thus, the piston and the cap are laterally deflected and the waveguide contacts of the plug part and the socket part come into contact in unhindered manner.

On releasing the plug connection the piston and cap again slide in front of the waveguide of the plug part and the socket part and in this way prevent a contamination of the waveguide contact surfaces.

The invention is described hereinafter relative to the attached drawings, wherein show:

FIG. 1 A longitudinal section through the inventive plug part in the unplugged state.

Figure 2:
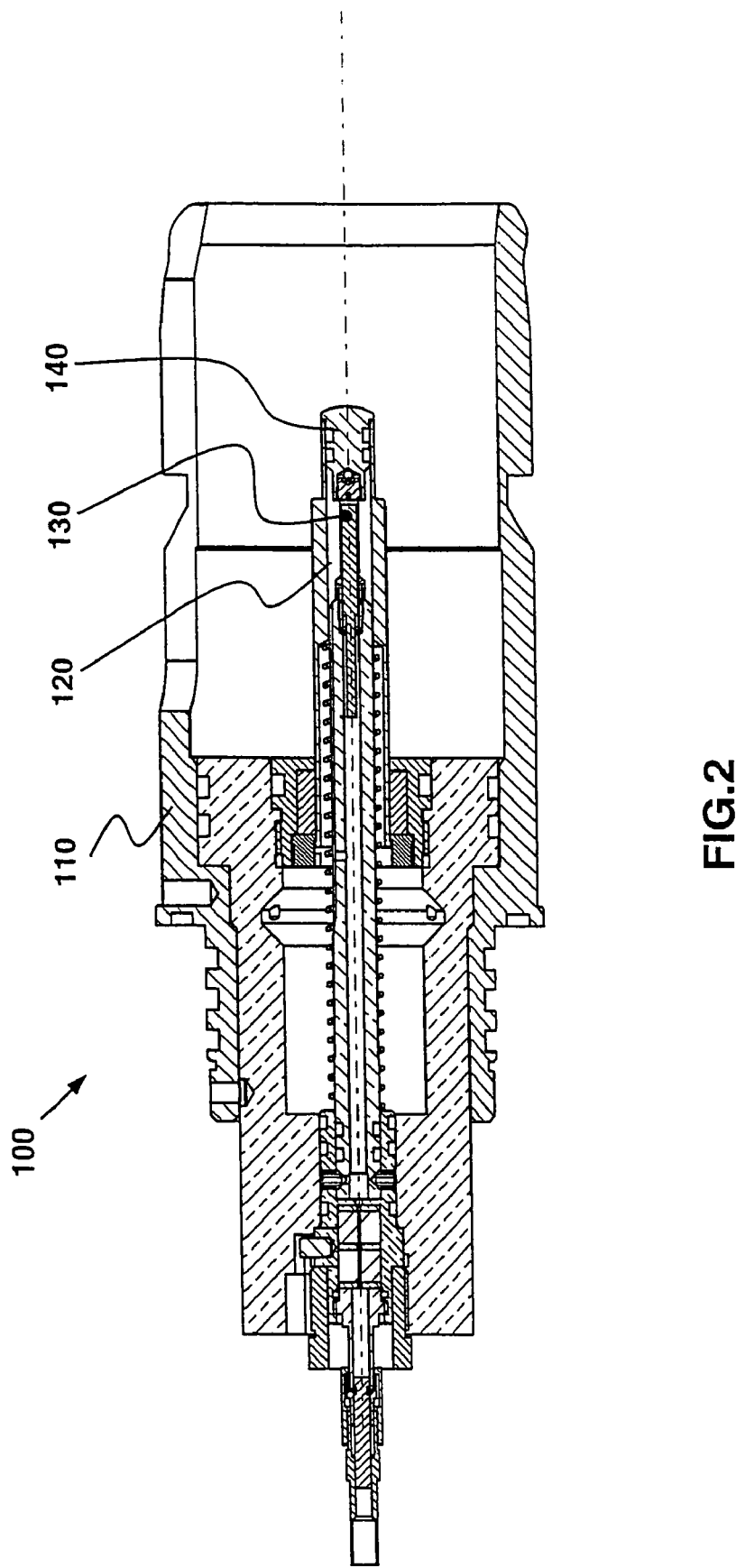

FIG. 2 A longitudinal section through the inventive socket part in the unplugged state.

Figure 3:
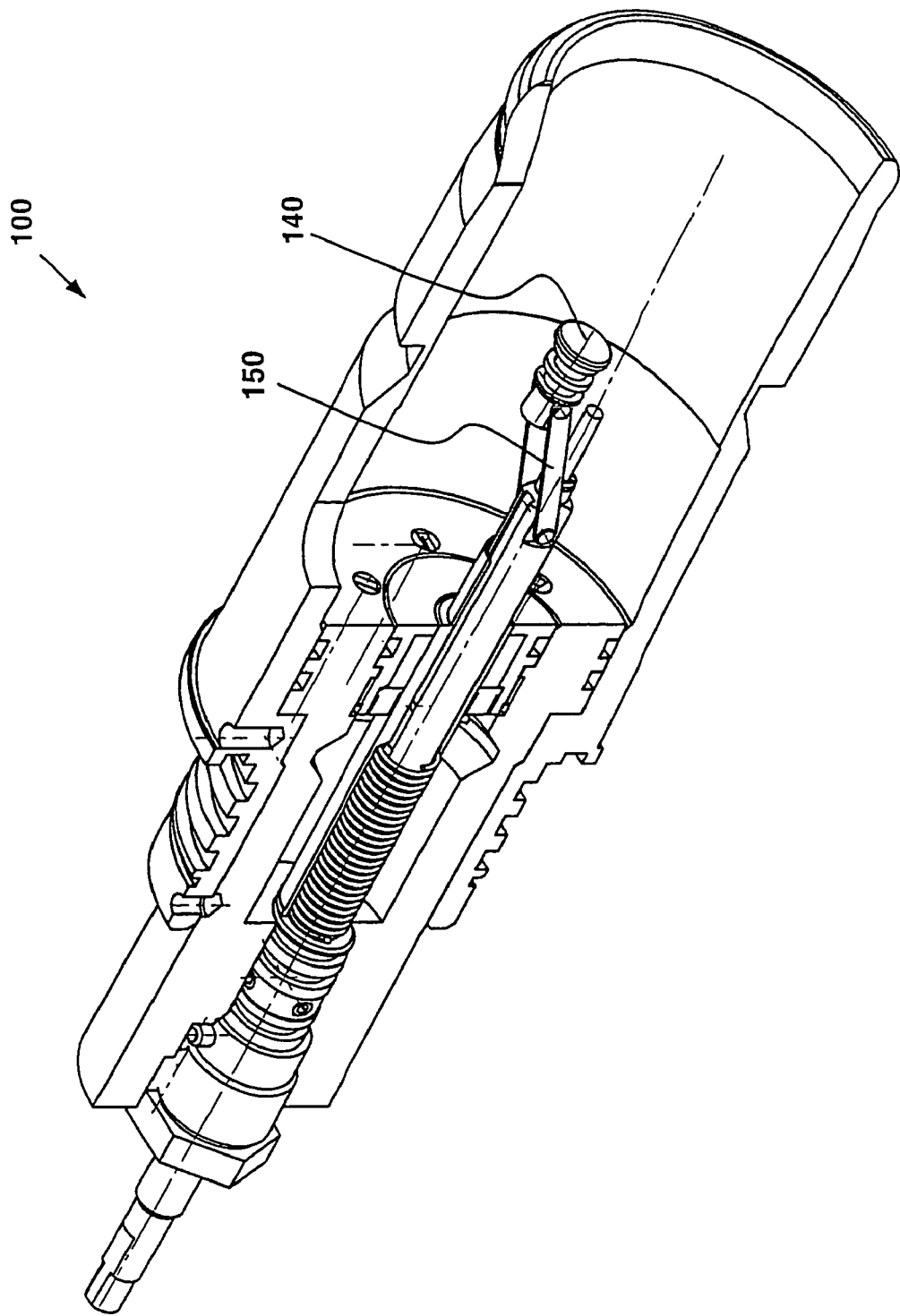

FIG. 3 A longitudinal section through the inventive socket part in the unplugged state in an isometric representation.

Figure 4:
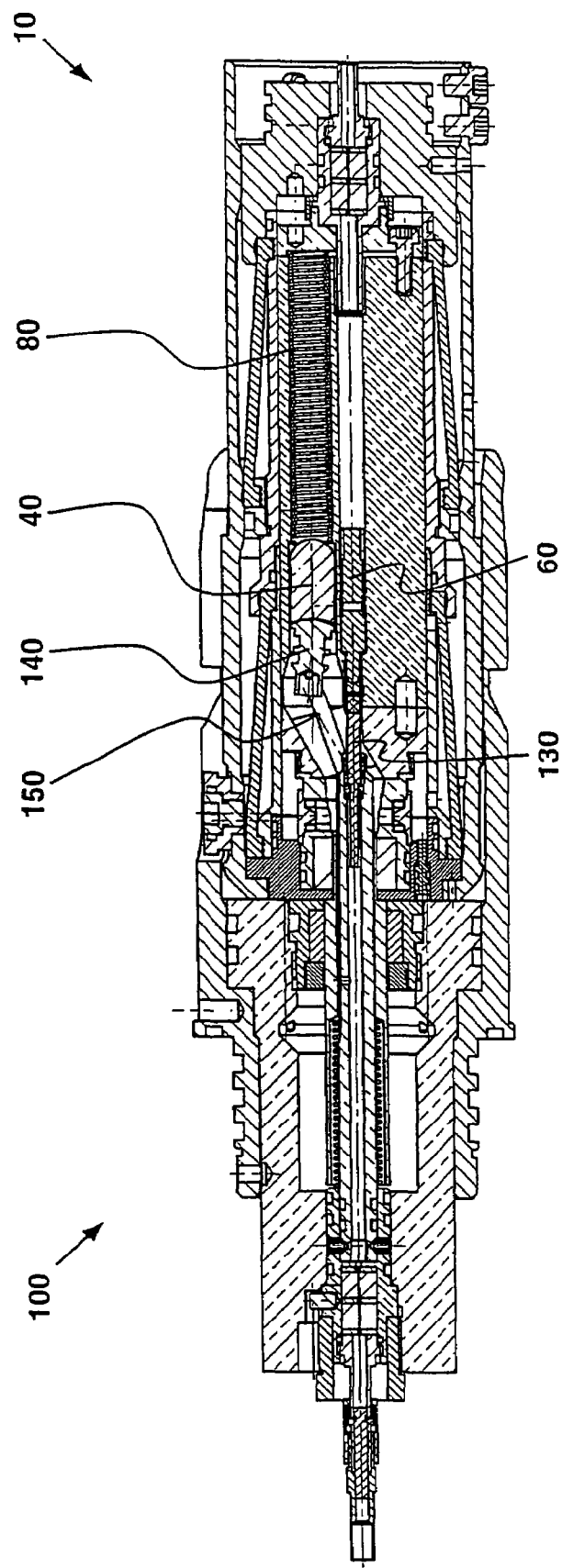

FIG. 4 A longitudinal section through the completely plugged plug connection.

FIG. 1 is a diagrammatic representation of the inventive plug part in a longitudinal section. The plug part 10 comprises a housing 20 with at least one, preferably concentrically arranged channel 30 housing the optical waveguide contact 60. The plug part 10 is sealed relative to the environment against elastomer seal 90 by a piston 40, which in the unplugged state is held in the position sealing the plug part 10 by a spring. Spring 80 runs in path 50 in which the piston 40 is displaced counter to the force of the spring during the insertion of plug part 100 shown in FIG. 2.

The diameter of path 50 is somewhat larger than the diameter of piston 40 and in at least one section 50a is inclined to the axis of channel 30 and therefore the waveguide contact of plug part 10. This ensures that during the plugging process the piston 40 is pivoted laterally and the front section of channel 50a through which the waveguide contact of socket part 100 is to pass, and therefore also the interface surface of waveguide contact 60 is released.

So that piston 40 can be pivoted laterally it is possible, as in the example shown, to make the diameter of piston 40 much larger than the diameter of the channel section 30a to be exposed or with approximately identical relative sizes, e.g. within the framework of a miniaturization, to give the piston 40 and the path 50 receiving the latter an external geometrical shape differing from the channel, so that although the piston is displaceable in path 50, it cannot enter the front section of channel 30a.

FIG. 2 shows a diagrammatic representation of the inventive socket part 100 in a longitudinal section. Socket part 100 comprises a housing 110 with at least one, preferably centrally arranged channel 120 housing the optical waveguide. The interface surface of waveguide contact 130 is protectively covered against the influences of the environment by a cap 140 in the unplugged state. The cap 140 is constructed pivotably so that it can be pivoted in the plugged state and frees the interface surface of waveguide contact 130. The cap 140 is preferably connected to housing 110 of socket part 100 by a universal joint, so as to facilitate guidance of cap 140 in path 50 of plug part 10.

FIG. 3 shows the structure of socket part 100 in an isometric sectional representation in the unplugged state.

FIG. 4 is a detail view in longitudinal section through the completely plugged plug connection. Cap 140 of socket part 100 has displaced the piston 40 of plug part 10 counter to the force of spring 80 over section 50a of path 50 at right angles to the axis of channel 30 of plug part 10 and has itself followed path 50, 50a. In the embodiment shown here it is readily possible to see a spacing element 150 spacing cap 140 from the plug part and which forms part of a universal joint permitting or facilitating the insertion of cap 140 into path 50, 50a.

Both main components of the optical waveguide plug connection, namely the plug part and socket part, have in a particularly preferred embodiment in each case a fluid-filled inner area, which permits a pressure compensation between the inner area and the environment with the external pressure by means of one or more diaphragms or one or more sliding pistons.

In a particularly preferred development plug part 10 of waveguide connector 10, 100 has means for rinsing with liquid waveguide contact 130 of socket part 100.

The invention claimed is:

1. An optical waveguide connector for use mainly in water comprising:
   a socket part having at least one first waveguide contact placed in a channel of the socket part; and
   a plug part with at least one second waveguide contact placed in a channel of the plug part, the channel of the plug part being sealed with a piston displaceable counter to the force of a spring,
   wherein the socket part has a pivotably constructed cap which is pivotally interconnected to a portion of the socket part about first and second, spaced pivot axes and pivots about said axes, said cap sealing an interface surface of the at least one first waveguide contact and which in an unplugged state covers an interface surface of the at least one first waveguide contact,
   wherein the plug part has a path receiving the piston and which in at least one section is inclined to an axis of the at least one second waveguide contact of the plug part, and
   wherein, during a plugging process, the cap of the socket part displaces the piston, frees the at least one first waveguide contact of the socket part, frees the at least one second waveguide contact located in the channel of the plug part and is guided through the path.

2. The optical waveguide connector according to claim 1, wherein the cap is connected by a pivoting device to the socket part.

3. The optical waveguide connector according to claim 2, wherein the pivoting device is rigid.

4. The optical waveguide connector according to claim 3, wherein the pivoting device includes a pair of spaced, rigid spacing elements pivotally interconnecting the cap and a portion of the socket part.

5. The optical waveguide connector according to claim 3, wherein the pivoting device is a universal joint.

6. The optical waveguide connector according to claim 1, wherein at least an inner area of the plug part is filled with a liquid and the plug part includes a diaphragm defining the inner area relative to a surrounding environment, with the diaphragm bringing about a pressure compensation between the inner area and the environment.

7. The optical waveguide connector according to claim 6, wherein the plug part includes means for rinsing with liquid the at least one first waveguide of the socket part.

8. The optical waveguide connector according to claim 1, further comprising: at least one pivot member spacing the cap and the portion of the socket part.

9. The optical waveguide connector according to claim 8, wherein the at least one pivot member comprises a pair of spacing elements.

10. The optical waveguide connector according to claim 1, further comprising: a universal joint pivotally interconnecting the cap and a portion of the socket part.

11. An optical waveguide connector for use mainly in water comprising:
   a socket part having at least one first waveguide contact placed in a channel of the socket part; and
   a plug part with at least one second waveguide contact placed in a channel of the plug part, the channel of the plug part being sealed with a piston displaceable counter to the force of a spring,
   wherein the socket part has a pivotably constructed cap connected to a portion of the socket part by a rigid pivoting device including a pair of spaced, rigid spacing elements, said cap sealing an interface surface of the at least one first waveguide contact and which in an unplugged state covers an interface surface of the at least one first waveguide contact,
   wherein the plug part has a path receiving the piston and which in at least one section is inclined to an axis of the at least one second waveguide contact of the plug part, and
   wherein, during a plugging process, the cap of the socket part displaces the piston, frees the at least one first waveguide contact of the socket part, frees the at least one second waveguide contact located in the channel of the plug part and is guided through the path.

12. An optical waveguide connector for use mainly in water comprising:
   a socket part having at least one first waveguide contact placed in a channel of the socket part; and
   a plug part with at least one second waveguide contact placed in a channel of the plug part, the channel of the plug part being sealed with a piston displaceable counter to the force of a spring,
   wherein the socket part has a pivotably constructed cap sealing an interface surface of the at least one first waveguide contact and which in an unplugged state covers an interface surface of the at least one first waveguide contact,
   wherein at least an inner area of the plug part is filled with a liquid and the plug part includes a diaphragm defining the inner area relative to a surrounding environment, with the diaphragm bringing about a pressure compensation between the inner area and the environment;
   wherein the plug part has a path receiving the piston and which in at least one section is inclined to an axis of the at least one second waveguide contact of the plug part, and
   wherein, during a plugging process, the cap of the socket part displaces the piston, frees the at least one first waveguide contact of the socket part, frees the at least one second waveguide contact located in the channel of the plug part and is guided through the path.

13. The optical waveguide connector according to claim 12, wherein the plug part includes means for rinsing with liquid the at least one first waveguide of the socket part.

* * * * *